United States Patent [19]
Smith

[11] 3,797,059
[45] Mar. 19, 1974

[54] TURNTABLE CAR WASH
[76] Inventor: Judson L. Smith, 3340 S. Butte, Apt. 9, Tempe, Ariz. 85282
[22] Filed: Oct. 12, 1971
[21] Appl. No.: 188,292

[52] U.S. Cl. .............................. 15/21 D, 15/DIG. 2
[51] Int. Cl. .............................................. B60s 3/06
[58] Field of Search............ 15/DIG. 2, 21 R, 21 D, 15/21 E, 97, 53; 134/45, 123

[56] References Cited
UNITED STATES PATENTS
| | | | |
|---|---|---|---|
| 1,694,197 | 12/1928 | Woodling | 134/45 |
| 3,451,085 | 6/1969 | Hay | 15/21 D |
| 3,510,898 | 5/1970 | Tatara et al. | 15/DIG. 2 |
| 3,683,441 | 8/1972 | Fromme | 15/97 R |
| 3,685,079 | 8/1972 | Dawson | 15/21 D |
| 3,643,272 | 2/1972 | Rickel | 15/21 D |

Primary Examiner—Edward L. Roberts
Attorney, Agent, or Firm—Woodard, Weikart, Emhardt & Naughton

[57] ABSTRACT

A power driven turntable has a conveyor thereon for moving a car onto the turntable while the turntable is held at rest. A control then locks the conveyor to hold the car in place on the turntable as it is rotated by a motor therefor. Means are provided by which individual components such as a wheel scrubbing brush can operate on said turntable. Brushes are mounted on horizontal axes mounted on arms hinged from above, and engageable with upwardly facing surfaces of the car as the turntable is rotated. Brushes are also mounted on carriages movable toward and away from the center of rotation, for scrubbing vertical surfaces of the car as the turntable turns. Tire soaking troughs for a caustic solution are provided near the entrance. Controls are employed to move the brushes in response to changes in pressure of engagement of the brushes against the surfaces as the car is turned.

14 Claims, 10 Drawing Figures

3,797,059

INVENTOR
JUDSON L. SMITH
BY
Woodard, Weikart Emhardt & Naughton
ATTORNEYS

INVENTOR
JUDSON L. SMITH
BY
Woodard Weikart Emhardt & Naughton
ATTORNEYS

3,797,059

TURNTABLE CAR WASH

BACKGROUND OF THE INVENTION

1. Field of the Invention

This invention relates generally to vehicle cleaning equipment, and more particularly to an arrangement whereby relative rotation in a horizontal plane is established between an array of rubbers (typically brushes or straps) and a vehicle, as the rubbers engage surfaces of the vehicle for rubbing thereof.

2. Description of the Prior Art

Washing equipment for various kinds of vehicles is well known and widely used. Perhaps some of the earliest machinery was developed for cleaning railway cars. Equipment also has been developed for cleaning large motor-vehicles such as buses. In recent years, much effort and development has taken place in connection with equipment for washing automobiles. Much of this equipment is described and claimed in expired and active United States and foreign patents.

Generally speaking, the prior art involves equipment which employs a conveyor or the self propulsion capability of the vehicle to move it through an array of spray nozzles, or nozzles and brushes, or other cleaning fluid applicators, Another approach is to permit the vehicle to remain stationary, while the cleaning equipment is moved relative thereto. One of the many examples of such equipment is shown and described in U.S. Pat. No. 3,328,551 issued Mar. 8, 1966 to J. F. Cirino et al.

Generally speaking, washing equipment admits a vehicle at one end and provides for its departure at the opposite end. While there are many situations where it may be convenient to provide an entrance and an exit in the same line and at opposite ends of the area where the washing is to be accomplished, there are others where it may not be convenient to provide the exit at the end opposite to the entrance. A possible solution to such a problem is shown and described in U. S. Pat. No. 3,011,501 issued Dec. 5, 1961 to R. B. Beranek, although it does not discuss this particular problem. That apparatus employs and array of spray nozzles and moves the automobile in relation thereto by employing a turntable with the automobile mounted thereon.

Many car-wash operators prefer the employment of cleaning fluid applicators such as waving or vibrating curtains, tapes or straps, or rotating brushes in rubbing contact with the vehicle surfaces, in order to obtain better cleaning action than is possible with nozzles and sprays alone. The present invention is intended to provide the versatility of site possibilities attainable with the turntable, and yet provide the cleaning excellence obtainable from application of mechanical rubbing effort at different angles to the vehicle surfaces themselves, such as by brushes or other mechanical cleaning fluid applicator means, as the vehicle is turned.

SUMMARY OF THE INVENTION

Described briefly, in a typical embodiment of the present invention, a turntable for the vehicle, and a stationary structure mounting a brush array, are employed to establish relative rotation (in a horizontal plane) between the vehicle and the brush array. It is conceivable that the vehicle could be stationary or conveyorized and the brush array rotated, as an array. Means are provided for admitting the vehicle, imparting the relative rotational movement between the vehicle and the array of brushes or other applicator means, and movement of the brushes in response to the contact of the various surfaces of the vehicle as the relative rotation is imparted. Various arrangements and specific mounts of brushes are employed. The turntable drive means is employed in combination with turntable lock means to activate the conveyor for moving the vehicle onto and off the turntable, when the turntable is at rest. An alternate method is a separate individual operating component (conveyor) for moving the vehicle onto and off the turntable when the turntable is at rest. Special coupling means are provided at the base of the turntable to implement fluid drive of components thereon. Wheel soaking troughs with driers are located adjacent an entrance to the conveyor.

DESCRIPTION OF THE PREFERRED EMBODIMENT

Figure 1:
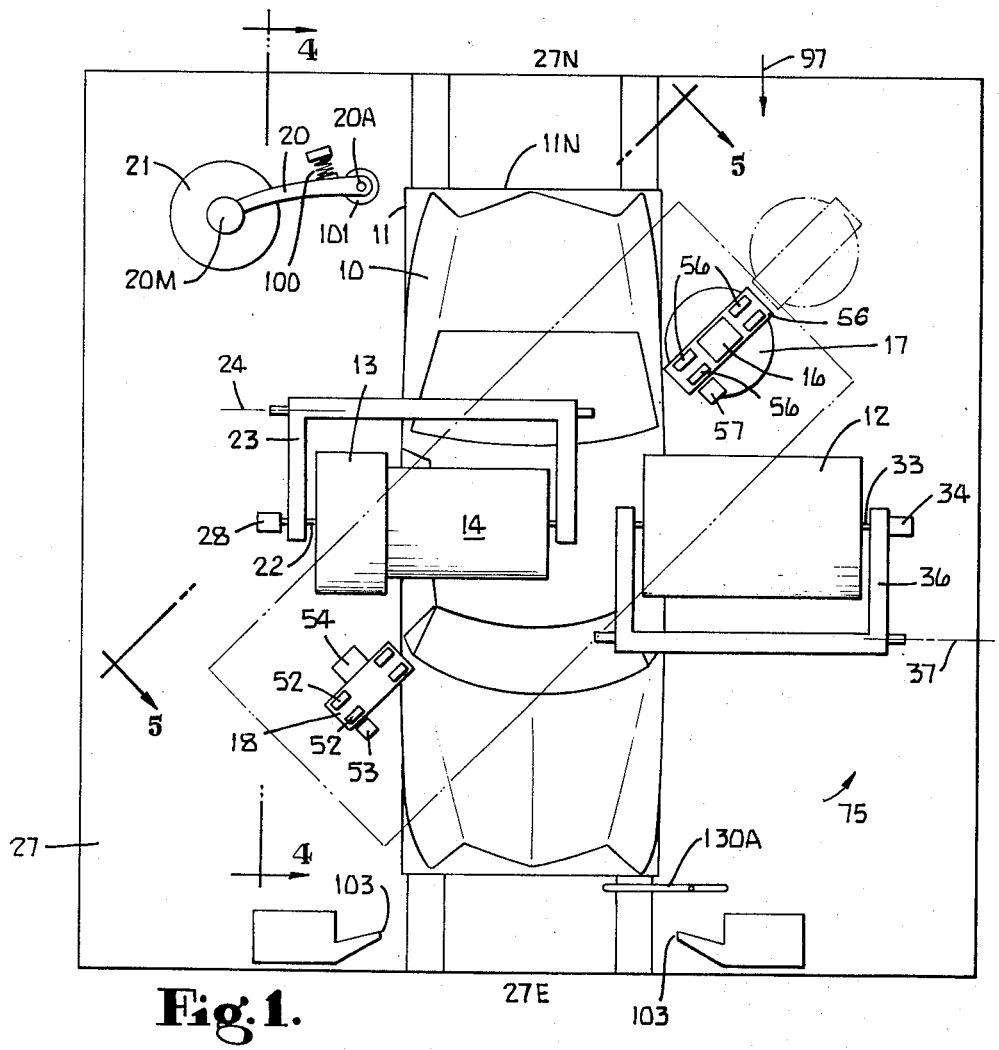
FIG. 1 is a top plan view showing the layout of the brushes and the vehicle on a turntable in a car washing establishment according to a typical embodiment of the present invention.
Figure 5:
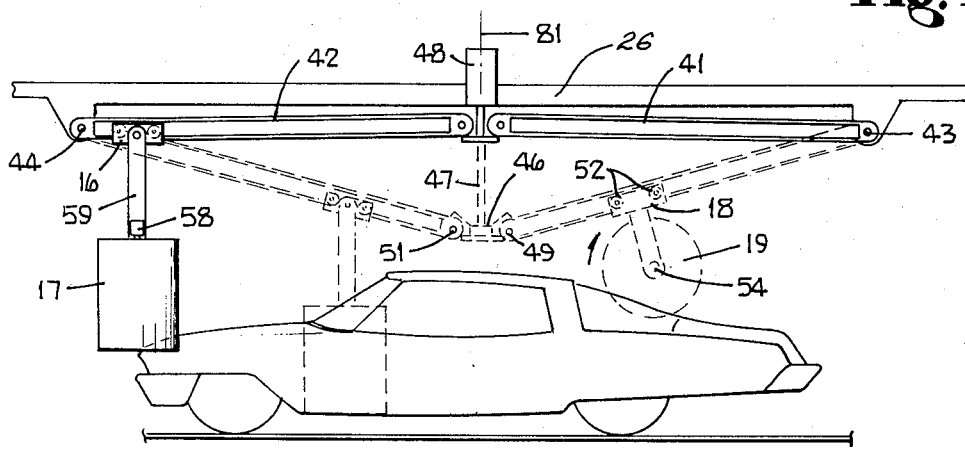
FIG. 5 is a section taken at line 5—5 in FIG. 1 and viewed in the direction of the arrows, and showing the relative relationship of the brushes for cleaning window, side, front and rear surrfaces of the vehicle.

Referring to the drawings in detail, and particularly FIG. 1 thereof, a vehicle is shown in solid outline as a car 10 on a rectangular turntable 11, and brushes 12 and 13–14 are shown disposed above a portion of the top thereof. A carriage 16 mounts a brush 17 thereon, and a carriage 18 mounts a brush 19 thereon. Although brush 19 is obscured from view in FIG. 1 by carriage 18, it is shown in FIG. 5. A brush 21 is also provided and, like brush 17, is arranged for rotation on a vertical axis, but, instead of mounting to a carriage, it is mounted to a frame 20 swingable on a vertical axis 20A. Brushes 12, 13–14, and 19 are arranged for rotation on horizontal axes.

Figure 4:
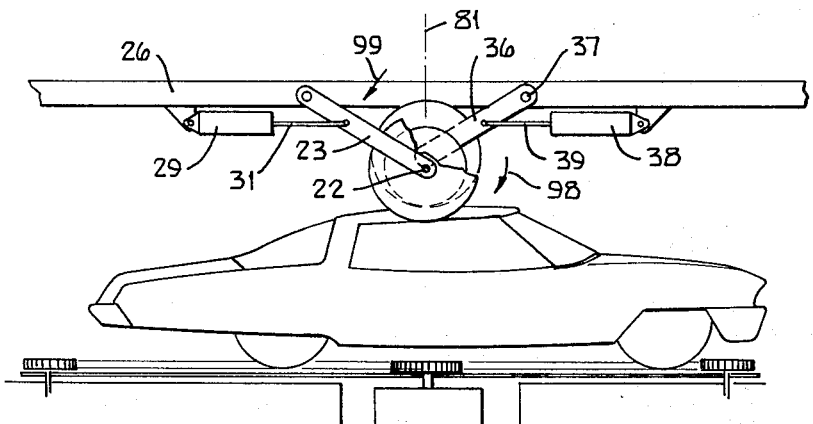
FIG. 4 is a section taken at line 4—4 in FIG. 1 and viewed in the direction of the arrows, and showing the relative positions of the two brush assemblies for cleaning the top surfaces.

The brush 13–14 is mounted on an axle 22 supported on an arm assembly 23 which is pivotally mounted by appropriate shaft and bearings to pivot on the horizontal axis 24 secured to the overhead structure 26 affixed to the base 27. The brush 13–14 is driven by a hydraulic motor 28. An appropriate hydraulic-operated balance and lifting cylinder 29 having a piston rod 31 pinned to arm assembly 23, may be employed for controlling the brush-crush in response to hydraulic line pressure applied to motor 28, in a manner described hereinafter. Similarly the brush 12 is mounted to an axle 33 driven by hydraulic motor 34 mounted to the arm assembly 36 mounted by a suitable shaft to the overhead structure 26 so that the arm assembly is pivotable on the horizontal axis 37. Again, as is described above and as shown in FIG. 4, the brush-crush can be controlled by the employment of a hydraulic cylinder and piston assembly 38 having piston rod 39 pinned to the arm assembly 36.

As best shown in FIG. 5, rails 41 and 42 are pivotally mounted at pins 43 and 44, respectively, to the overhead structure 26. These rails are also connected to a plate 46 mounted to the piston rod 47 projecting downwardly from the piston in cylinder 48 affixed to the overhead structure 26. The rails are pinned to the plate 46 at 49 and 51, and sufficient tolerance is provided in the connection so that as the piston rod 47 is moved up by pressure applied under the piston in the cylinder 48, the rails 41 and 42 are moved upwardly about their respective pivotal connections, to the overhead structure, from the position shown by the dotted lines to the position shown by the solid lines, wherein they are inclined slightly downward from plate 46 toward pins 43 and 44.

The cross sectional shape of each of the rails 41 and 42 is that of an I beam so that carriage 18, for example, can be mounted thereto by four rollers or wheels 52, one or several of which may be drivable by a hydraulic motor 53. Brush 19 is drivable in rotation on the horizontal axis thereof by the hydraulic motor 54. Similarly, the carriage 16 is mounted to the rail 42 by four wheels 56, one or several of which may be driven by hydraulic motor 57. The hydraulic motor 58 is mounted to the post 59 projecting down from carriage 16 to drive the brush 17 on a generally vertical axis.

Figure 2:
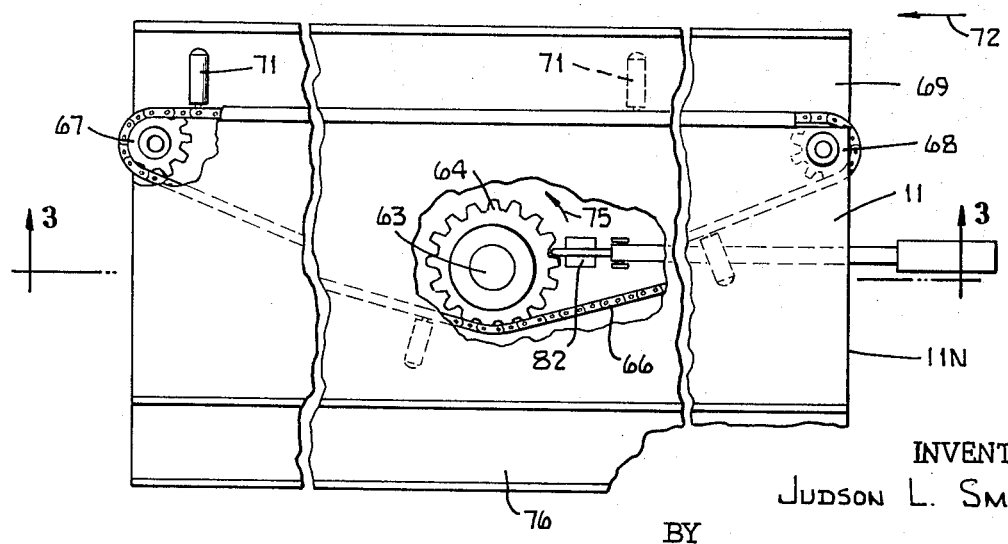
FIG. 2 is an enlarged, partially cutaway plan view of the turntable and the drive therefor and the conveyor thereon, with portions being broken out of the length of the turntable to conserve space in the drawing.
Figure 3:
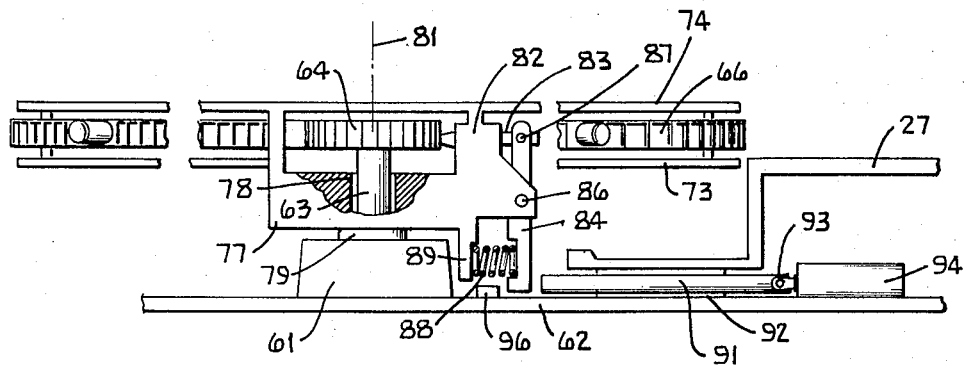
FIG. 3 is a section through the turntable and drive assembly taken at 3—3 in FIG. 2 and viewed in the direction of the arrows.

Referring specifically to FIGS. 2 and 3, there is a motor and gear box assembly 61 secured to the foundation or base 62 and having an upstanding output shaft 63 with a sprocket 64 mounted at its upper end. A chain 66 engaging sprocket 64 extends around idler sprockets 67 and 68 which are adjacent opposite ends of the vehicle wheel receiving track 69 on the turntable 11. This chain 66 has a plurality of tire engaging rollers 71 spaced therealong and which, being cylindrical, can roll along the track 69 in the direction of arrow 72 when the sprocket 64 is driven in the direction of arrow 75 and the turntable 11 is held stationary.

As shown in FIG. 3, the chain 66 is located between the plate 73 and plate 74, the former being at the level of and providing the top face of the track 69 for the right-hand tires of a car moved onto the turntable in the direction of arrow 72, and also for the track 76 provided to receive the left-hand tires. The plate 74, between the two tracks 69 and 76, provides a cover for the sprocket, chain 66 and the rollers 71 as they return from one end of track 69 to the other end thereof. The two plates 73 and 74 may also serve as bearing mounts for the idler sprockets 67 and 68. The plates 73 and 74, and thereby the turntable itself, may be affixed to a hub 77 mounted by suitable radial and thrust bearings at 78 and 79 to the shaft 63 and gear box 61, respectively. Thus the turntable is supported for rotation about the vertical axis 81.

The hub 77 has a guide 82 receiving a drive pin 83 therein which is shown received between two sides of the guide and between two teeth of the sprocket, in FIG. 2. Accordingly, when the sprocket is rotating in the counterclockwise direction of arrow 75, and the pin 83 is engaged with the sprocket, the turntable is rotated in the direction of arrow 75.

A lever or rocker arm 84 is fastened to the hub 77 by means of pivot pin 86 to pivot on a horizontal axis at pin 86. The upper end of arm 84 is pinned at 87 to the drive pin 83. A compression spring 88 between a lower portion of arm 84 and a spring seat 89 on the hub 77 normally urges the drive pin into the space between a pair of adjacent teeth of the sprocket 64 (as shown particularly in FIG. 2) so that the turntable is normally engaged for rotation. However, when the turntable is in an index position of registry of end 11N thereof with the car wash entrance at 27N, the lower end of arm 84 is in registry with a slide 91 guidingly received in a cylindrical bushing, for example, 92 secured between base members 62 and 27. This slide is connected to the piston rod 93 of a cylinder 94. The piston rod is extendable to engage the end of slide 91 with the lower end of arm 84 and push the arm against the resistance of spring 88 to pivot the arm about pin 86 and remove the drive pin from the space between adjacent teeth of the sprocket. This terminates rotational drive of the turntable, although the rotating sprocket 64 will continue to drive the chain 66. If it is desired to halt rotation of the turntable immediately upon withdrawal of pin 83, a pair of stop lugs 96 can be affixed to the base plate 62 on opposite sides of the space into which the lower end of lever 84 will be driven by the slide 91, whereupon the lever will be trapped between the two lugs 96 and abruptly terminate rotation of the turntable.

OPERATION

In the operation of the apparatus according to the illustrated embodiment of the present invention, with all brushes out of the way, and cylinder 94 holding the turntable disengaged so that it is at rest, the automobile is driven in the direction of arrow 97 onto the platform or floor 27 at the entrance 27N. It is only necessary to drive it far enough to get a front tire onto the turntable 11 at its entrance end 11N. Thereupon with the turntable drive pin disengaged, and the conveyor chain 66 being driven, one of the rollers 71 will swing around sprocket 68 and engage the wheel to thereupon move the car onto the turntable.

Figure 6:
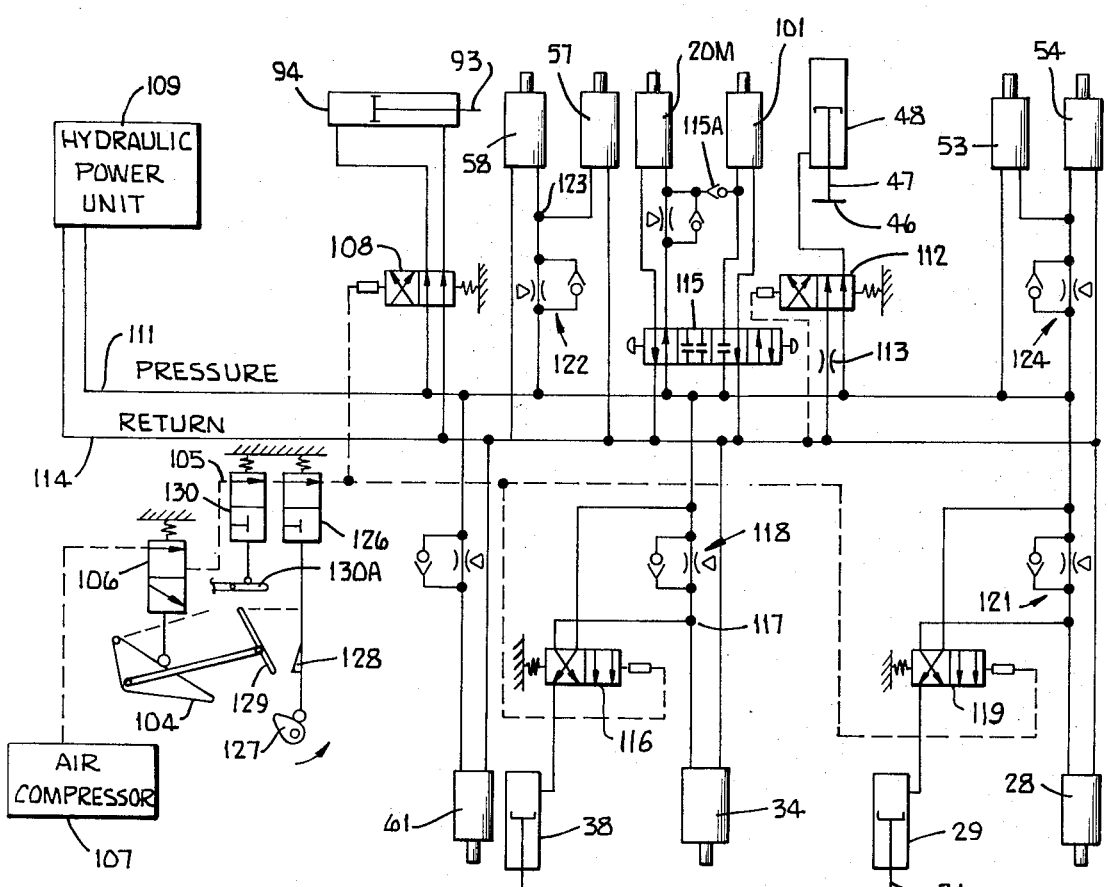
FIG. 6 is the combination hydraulic and pneumatic schematic for the operating components.

When the car is properly in place on the turntable, a wand 104 (FIG. 5 & 6) which may be engaged by the front tire as it approaches a stop point of its travel on the turntable, actuates a two-way, normally closed (NC) air valve 106 (FIG. 6). This applies air pressure from compressor 107 to the pilot for valve 108. This valve 108 is thereby switched to apply hydraulic pressure from source 109 on line 111 to the rod end of cylinder 94 to retract the slide 91 whereupon the spring 88 is able to move the drive pin into a space between teeth on the sprocket, initiating revolution of the turntable in the direction of arrow 75. Simultaneously therewith, air pressure applied to the pilot for valve 112 switches it to connect pressure in the overhead cylinder 48 through orifice 113 to hydraulic return line 114 to permit descent of the junction plate 46, whereupon the carriages 16 and 18 can move downward along their respective rails 42 and 41 until engagement of the brushes thereon with surfaces of the automobile. Similarly, air pressure from valve 106 applied to valve 116 shifts it to remove from lift cylinder 38 the hydraulic line pressure and substitute therefor the pressure at point 117. At this point line pressure has been reduced by the adjustable, pressure-compensated, flow-control (APCFC) valve 118 to provide a level of input pressure sufficient to drive the brush at acceptable speed, with a crush on the bristles thereof at an acceptable level as maintained by the balancing pressure in cylinder 38. As the brush encounters increased resistance to rotation, the pressure at its motor input rises, thus increasing the balancing pressure in cylinder 38 to reduce the portion of brush weight applied to the bristles. This reduces the resistance to brush rotation so it can speed up, whereupon pressure at 117 will drop to normal. This is the automatic brush crush control feature. It is used also with motor 28 and lift cylinder 29, controlled by valves 119 and 121 corresponding, respectively, to valves 116 and 118.

The automatic crush control is also used for the brushes 17 and 19 (FIG. 5). As shown in FIG. 6, hydraulic pressure line 111 is connected through APCFC valve 122 to one side of the hydraulic drive motor 58 for brush 17, the other side of the motor being returned to low pressure line 114. The junction 123 in the motor supply line is connected to one side of the hydraulic motor 57 for diving the carriage upward and outward along rail 42, with the other side of the motor connected to the return line 114. Valve 122 is adjusted to provide at the motor inputs sufficient pressure to drive the brush at the desired speed under normal load conditions. As the load increases, the speed decreases so the pressure rises. This pressure rise causes the carriage motor to drive the carriage upward and outward enough to reduce the load on the brush, whereupon pressure decreases, and the carriage and brush assembly will move downward and inward toward the car. So long as rail 42 is downwardly inclined, the weight of the brush and carriage assembly will move the brush toward and urge it against the car, with the carriage motor being used to sufficiently offset the weight to obtain the amount of brush crush desired for satisfactory scrubbing action. The same kind of arrangement is used for the motor 54 for brush 19, supplied through APCFC valve 124.

As the car is turned in the counterclockwise direction of arrow 75, brush 17 rotates clockwise as shown by the arrow associated therewith in FIG. 1. The top and window brush 14-13 rotates clockwise in the direction of arrow 98 in FIG. 4. The hood, trunk-lid, and window brush 12 rotates counterclockwise in the direction of arrow 99 in FIG. 4. Brush 19 rotates clockwise as shown in FIG. 5.

The positions of the various brushes against the car surfaces will depend on the particular orientation of the car at the time and, as the crush on the brush increases the resistance to rotation, the hydraulic pressure in the supply line to the motor driving it will rise and thereby actuate the carriage drive motor or brush arm lift cylinder, as the case may be, to move the brush in a direction which will reduce the crush thereon. Accordingly, the brush positioning means accomodates the movement of the vehicle in rotation as the brush works on the surfaces engagable thereby.

Once all the surfaces have been rubbed by the brushes, the rotation of the turntable can be terminated, and the car removed. This does not necessarily require a complete rotation of the turntable because it will be observed that the brush 21 is also available. This brush, while intended primarily for washing the rear end of trucks or station wagons, can also be employed for other vehicles and thus reduce the number of degrees through which the vehicle must be turned in order to have worked on all of the generally vertical surfaces thereof with one or more brushes. The brush 21 is advanced in conventional manner by a spring 100 and retracted by hydraulic rotary actuator 101 mounted to the arm thereof. Drive motor 20M therefor is associated with the actuator 101 in the same way as brush motor 58 is associated with carriage drive motor 57 in FIG. 6 for brush crush control. However there is a manually operable selector valve 115 in the supply and return lines for these components. If operation of brush 21 is not desired, valve 115 is shifted to the left from the position shown in FIG. 6. This applies full line pressure to actuator 101 to swing the brush away from the car, and check valve 115A prevent pressure from being applied to the motor 20M.

Assuming for the moment that the brush 21 is not employed, and the turntable makes a complete 360° turn, the washing of the vehicle is completed at that point. In order to terminate the washing operation, a valve 126 may be provided in the air line 105 (FIG. 6). This valve, spring biased open, may be closed by a cam associated with the turntable such that, upon completion of the desired extent of car rotation, the air supply will be cut off from the various valve pilots. A lug 128 may be provided on the valve operating stem to engage latch 129, which is linked to wand 104 and held in dotted line position so long as the tire keeps wand 104 in the position holding valve 106 open. Therefore, although the cam 127 may move away from position closing valve 126, as the turntable stops, the latch will hold valve 126 closed until the car is moved off the turntable. Then, although valve 126 is unlatched as the tire clears the wand, valve 106 is also closed, so the brushing machinery remains at rest. Normally open air valve 130 is closed by wand 130A engaged by the side of the vehicle as it moves off the turntable to prevent the rear tires from activating the turntable and brushes as they engage the wand 104. Air logic devices may be employed also.

When air pressure is cut off from the pilot to valve 112, and hydraulic pressure in cylinder 48 lifts plate 46, the carriages roll down and out on the rails toward pins 43 and 44.

When air pressure is cut off from the pilot to valve 108, turntable stop and conveyor-start cylinder 94 is operated to release the turntable drive pin, whereupon the conveyor will remove the car from the turntable in the direction of arrow 97 for its departure at the exit 27E of the floor or platform 27. During its departure, it moves past the drier nozzles 103 for removal of water therefrom by the combination of blast and drying effects. Other accessories such as waxing equipment can be included if desired.

It should be understood that various pre-wetting or rinsing nozzle arrays can be employed, and typical in-brush cleaning fluid nozzles can also be employed. Where the expression "cleaning fluid" is used herein, it typically means water, soap and water, or a combination thereof with other cleaning fluids. It is also conceivable that in the future, some fluid other than water might be employed.

As examples, the brush 12 which is a "monster brush," may be a brush 60 inches in diameter and 72 inches long. The brush 13–14 may also be 72 inches long overall, and stepped from 60 inches to 48 inches in diameter and also referred to as a "monster brush." It is expected that the pivots for the overhead brush arms at 24 and 37 will be 72 inches from the floor surface. The brush 17 may be 34 inches long and 36 inches in diameter. The brush 19 may be 36 inches in diameter and 12 inches thick. Overall dimensions of the floor or platform 27 to provide ample space for the necessary components, may be 25 feet on each side. Although the turntable is described as rectangular, this would result in open spaces in the floor 27, which would likely be objectionable if any personnel were in the area. Accordingly, the turntable would typically be round.

Figure 7:
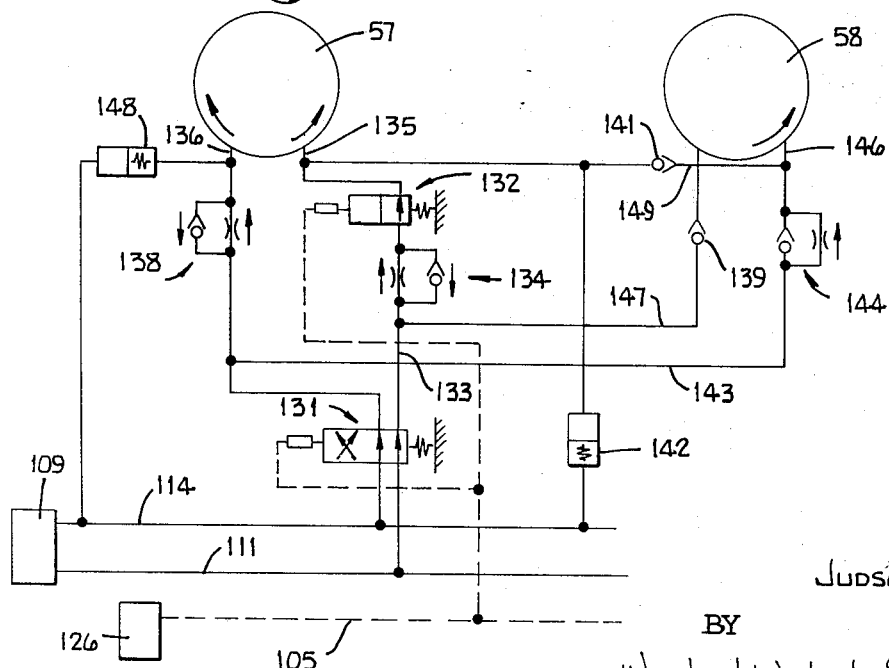
FIG. 7 is a supplemental hydraulic and pneumatic schematic for the operation of brushes that rub the vertical surfaces of the vehicle in an alternate embodiment wherein the I-beam in FIG. 5 to which said brushes are mounted, can be non-movable.

Referring now to FIG. 7, the hydraulic pressure and return lines 111 and 114 of FIG. 6 are shown as is the air pressure line 105 downstream from valve 126. In this embodiment, representing apparatus for carriage and brush operation where the beams 41 and 42 are stationary, the cylinder 48 and valve 112 and associated components are omitted. Instead, the supply and return circuitry for the brush motor 58 and carriage motor 57 are changed so that the carriage motor can drive the brush in toward the car or out away from the car, depending upon circumstances.

Beginning with the situation where there is no car on the turntable, the valves 131 and 132 are in their positions as shown. In this condition, hydraulic pressure from line 111 passes through valve 131, line 133 APCFC valve 134, and valve 132 to the retraction port of the carriage motor 57 which has driven the carriage, and thereby brush 17 away from the car toward its rest and inactive position. Under these circumstances, the fluid departing from the advance port 136 of the carriage motor can return through the check valve in APCFC valve 138 and through valve 131 to the return line 114. The brush 58 is not operating at this time because the check valve 139 blocks the hydraulic fluid in line 133 from reaching the motor 58. Similarly the check valve 141 blocks the hydraulic pressure from the retraction port 135 of the carriage motor to the brush motor 58. Accordingly the brush is retracted from the turntable area and is at rest.

Upon operation of wand 104 (FIG. 6) air pressure is applied in line 105 as described in the previous description, which, acting on the pilots for valves 131 and 132, shifts the two valves. Valve 132 thus blocks that path of the carriage motor. Shifting of valve 131 applies hydraulic pressure from line 111 through APCFC valve 138 to the advance port 136 for the carriage motor. The restriction in valve 138 controls the rate at which the carriage motor advances, and the return side thereof is connected through a pressure relief valve 142 to the hydraulic return line 114.

Hydraulic pressure from line 111 is connected to valve 131 and line 143 and APCFC valve 144 to the brush motor inlet line 146 to drive the brush motor. The brush motor return line through check valve 139 and line 147 and line 133 and valve 131 to the hydraulic line 114 returns the hydraulic fluid from the brush motor to the return line as the brush operates.

The APCFC valve 138 is adjusted to provide a downstream pressure at the advance port 136 of the carriage motor at approximately 200 pounds per square inch, for example. A pressure relief valve 148 is provided from this port to the hydraulic return line 114 and may be set at 350 pounds per square inch, for example. The purpose of this will become apparent as the description proceeds.

The brush crush control feature is provided by the connection from the brush motor supply inlet 146 through line 149 and check valve 141 to the retraction inlet 135 of the carriage motor 57. As the brush load increases, and the pressure in line 146 rises accordingly, it is applied through check valve 141 and the retraction inlet 135 of the carriage motor 57 to overcome the pressure applied on the advance inlet 146 to begin reverse operation of the motor and retraction of the carriage. If the relief valve 148 is set at 360 psi, the brush motor inlet pressure must rise above this level to begin retraction of the brush. Similarly the setting of pressure relief valve 142 must be above 350 psi to avoid shunting pressure from the brush motor inlet line 146 through valve 142 to the return line and thus defeating the crush control. Thus it is likely that the pressure at relief valve 142 would be set at at least 380 psi. As retraction of the carriage reduces the loading on the brush, the pressure at the brush motor inlet 146 falls and the balance point is reached at the carriage motor 57 whereupon its motion stops and the brush continues to operate at the desired speed until the load increases or decreases for some reason such as the turning of the car on the rotational axis of the turntable. Accordingly a constant compensating effect is obtained in order to maintain the continued desired rate of operation of the brush. The same combination as just described for brush motor 58 and carriage motor 57 is employed for brush motor 54 and carriage motor 53 where the rails on which the carriages operate are not inclined to obtain travel of the brushes toward the automobile.

Figure 8:
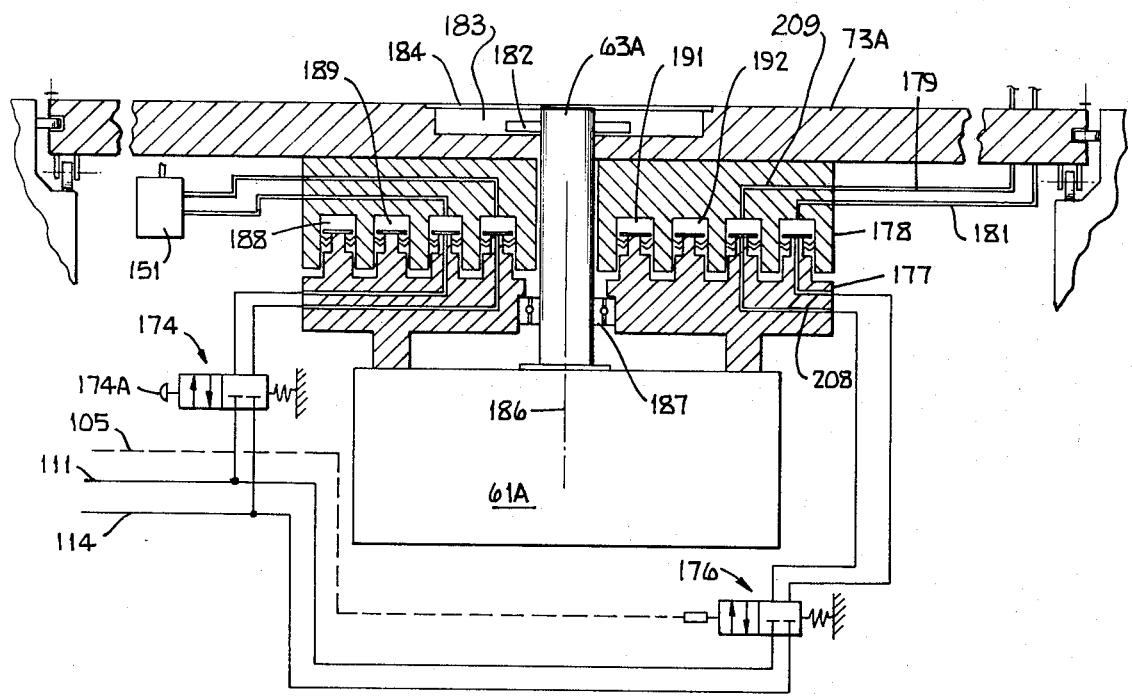
FIG. 8 shows a section view of a gear-box drive and coupling which permits supply of fluids to various fluid powered components on the turntable while the turntable is in movement.
Figure 9:
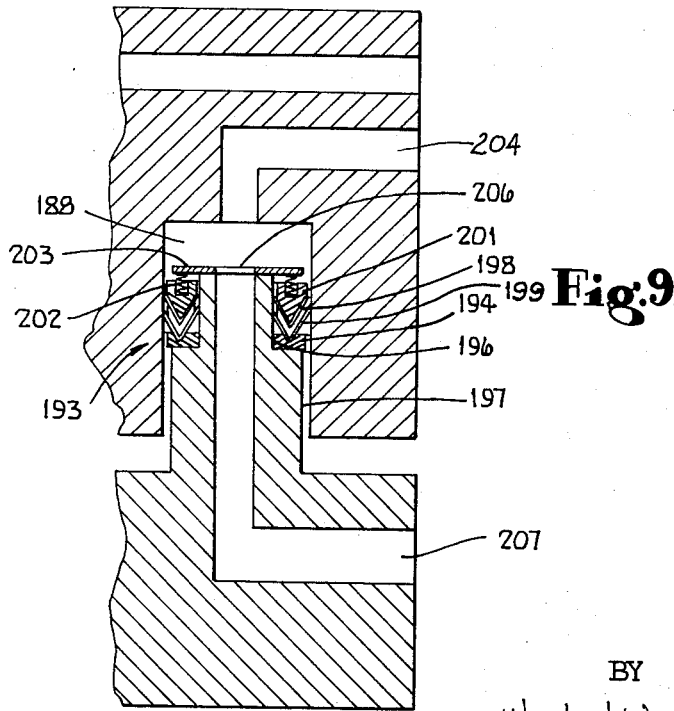
FIG. 9 is an enlargement showing the relative positions of rotating and stationary members along with necessary U seals.
Figure 10:
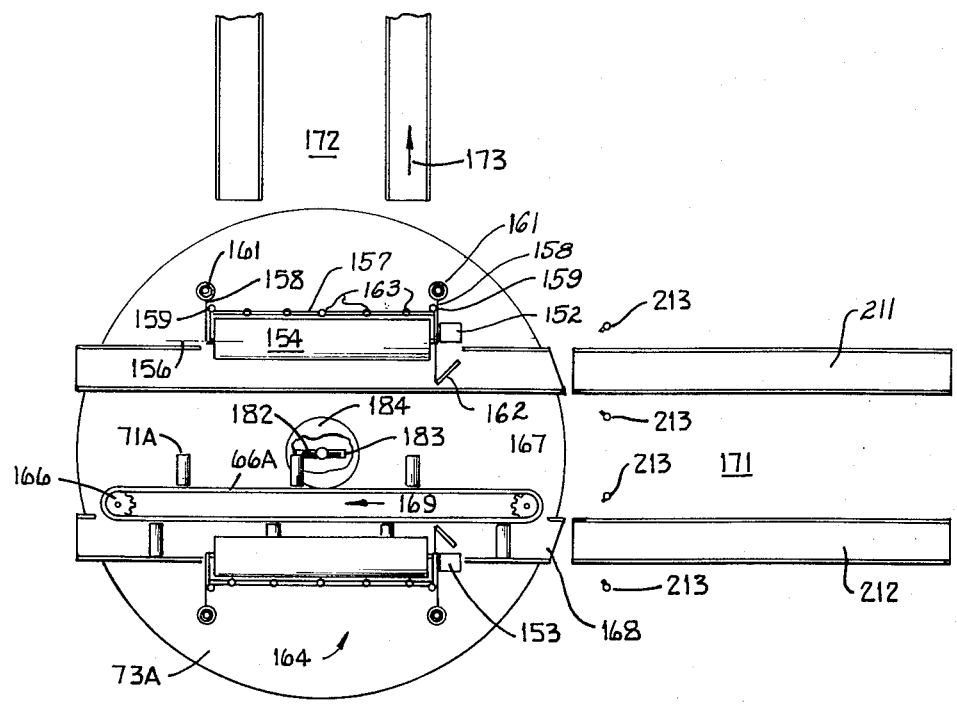
FIG. 10 is a top view showing components which could be operated on the turntable while the turntable is in movement, or stationary, or both, and more specifically, brushes for scrubbing the wheels, tires, and rocker panels, and a conveyor means, and showing a departure direction transverse to the entrance direction, and showing wheel soaking troughs at the entrance.

Referring now to FIGS. 8, 9 and 10, there is shown an embodiment of the turntable wherein the turntable is driven by one motor and transmission assembly 61, the conveyor is driven by a motor and transmission 151, and a pair of wheel cleaning brushes are driven by motors 152 and 153 (FIG. 10). Each of the wheel brushes, such as brush 154, is mounted to rotate on a horizontal axis 156 on a frame 146 which is pivotally mounted to a pair of arms 158 at pivot pins 159, parallel to the rotational axis of the turntable 73A. A roller 162 rotatably mounted to the frame 157 toward the entrance end of the turntable, is engageable by the entire tire to swing the brush as needed to admit the wheel of the car. The motor 152 drives the wheel brush 154 on its rotational axis 156, and a plurality of water sprayheads 163 may be provided along the length of the brush on the frame 157. This type of wheel brushing structure is conventional and is duplicated at 164 for washing the wheels on the opposite side of the car.

Further referring to FIG. 10, a chain 66A has a plurality of rollers 71A spaced therealong, and extends between sprockets 166 and 167. Conveyor drive motor 151 (FIG. 8) is connected to and drives sprocket 166 to move the flight of chain next to the wheel track 168 in the direction of arrow 169 to move the car from the entrance 171 onto the turntable and, after washing, to move the car off the turntable to the exit 172. Note that in this embodiment, the exit path is disposed at 90° with respect to the entrance path. Thus, complete washing of the car is expected to be accomplished in 270° degrees rotation of the turntable, whereupon the turntable is stopped and the car is discharged in the direction of arrow 173.

In the illustrated embodiment, the wheel brush drive motors 152 and 153 are hydraulic motors, and the conveyor drive motor 151 is a hydraulic motor.

To provide energy for the conveyor drive motor and wheel brush drive motors, the hydraulic supply is provided from the power unit 109 of FIG. 6 or 7, for example, through the high pressure line 111, and return is through line 114. A push button valve 174 is provided for controlling the supply of hydraulic fluid to the conveyor motor 151. An air pilot operated valve 176 is provided for controlling supply of hydraulic fluid to the wheel washing brush motors 152 and 153. To provide the necessary communication between these valves and the respective motors, a special coupling assembly is provided according to the present invention. This includes a lower manifold assembly 177 secured to the gear box 61A and to which the hydraulic lines from valves 174 and 176 are connected. An upper manifold 178 is secured to the turntable 73A and the hydraulic lines to the motor 151 are connected thereto and hydraulic lines 179 and 181 to the pair of wheel brush drive motors are also connected thereto. In this embodiment, while other drive arrangements may be employed, the turntable drive shaft 63A is provided with a shear pin 182 received in a longitudinally extending slot 183 in the top of the turntable, which is typically covered by a cover plate 184 in the center. The upper manifold 178 may pilot on and in any event is centered on the rotational axis 186 of the shaft 63A, and the lower manifold member 177 is also centered on the shaft 63A by means of the bearing 187.

The upper coupling manifold has a plurality of annular grooves 188, 189, 191, and 192. Similarly the lower manifold member 177 is provided with a plurality of radially spaced annular ribs received in the grooves.

As best shown in the enlarged fragmentary view of FIG. 9, the top of each rib is provided with a pair of V seal assemblies. The assembly 193 may include a locator ring 194 extending around the entire circumference of the wall 196 of the rib 197 and having a V notch therein receiving the bottom portion of the seal. The seal may include two flexible members 198 and 199 having a spacer therebetween, the flexible members being made of "Teflon" for example. The upper one of these seals receives an expander 201 which is loaded by a spring 202 in the annular groove in the upper face of the expander and seated against a ring 203 secured to the upper margin of the rib around its entire circumference. Therefore, when hydraulic fluid is returning from the brush drive motors through the line 181 into passageway 204 and then into the chamber at the top of groove 188, it will be confined in that chamber and its only avenue of departure will be through a port 206 provided at one point in the circumfernece of the rib and associated passageway 207 through valve 176 to the return line 114. A like construction provides the hydraulic fluid path for the high pressure from line 111 through valve 176, passageway 208 (FIG. 8) the chamber in groove 189 above the seal assembly, then passageway 209 and high pressure line 179 to the drive motors for the wheel brushes. A like construction is provided for the supply and return paths for hydraulic fluid to and from the conveyor drive motor 151. Additional grooves and passageways can be provided, if desired, for hydraulic fluid for other accessories and for cleaning fluid to be applied to the other accessories, if done through the turntable. With the controls as shown in FIG. 8, the conveyor drive motor 151 operates only when the push button 174A for switch 174 is actuated and this may typically be under control of a person in charge of the car washing equipment. The valve 176 for the wheel washing brushes is controlled automatically by the air supply controlled as described above in response to actuation of a wand 104, for example, for the tire of the car as it reaches an appropriate position on the turntable.

Referring further to FIG. 10, a pair of troughs 211 and 212 is provided at the entrance. These troughs which are approximately 12 feet long and 8 inches deep, have caustic soda solution therein, and receive the tires of the car as it approaches the turntable. The trough on the left-hand side of the car may be approximately 1 foot wide, whereas that on the right-hand side may be approximately 2 feet wide. This facilitates cleaning of the white wall tires by the wheel brushes. Air nozzles 213 at the exit of the trough blow excessive solution off the tires.

While the invention has been disclosed and described in some detail in the drawings and foregoing description, they are to be considered as illustrative and not restrictive in character, as other modifications may readily suggest themselves to persons skilled in this art and within the broad scope of the invention.

What is claimed is:

1. A vehicle cleaning apparatus comprising:
   first and second members, one of said members being stationary and the other of said members being rotatable in a generally horizontal plane,
   said first member having means thereon for retaining a vehicle thereon during cleaning, and
   said second member having cleaner applicator means thereon adapted to contact the surface of a vehicle on said first member,
   carriage and rail means connecting said applicator means to said second member, said carriage means being movable linearly along said rail means toward and away from a point near an axis of relative rotation of said members, to move said applicator means linearly to accommodate variations in vehicle contours contacted by said applicator means during relative rotation between said members,
   and actuator means mounted to said second member adjacent to said axis,
   said rail means including a rail having one end portion connected to said actuator means, and having its opposite end portion pivotally connected to said second member, said one end portion being vertically movable and controllable by said actuator means to incline said rail to encourage movement of said carriage means, and thereby said applicator means, toward said point.

2. The apparatus of claim 1 wherein:
said rail means include a second rail having one end portion connected to said actuator means and having its oppostie end portion pivotally connected to said second member,
said carriage means include a first carriage mounted on the first mentioned of said rails, and a second carriage mounted on said second rail, and
said applicator means include a first brush supported by said first carriage and rotatable on a generally horizontal axis, and a second brush supported by said second carriage and rotatable on a generally vertical axis.

3. A vehicle cleaning apparatus comprising:
first and second members, one of said members being stationary and the other of said members being rotatable in a generally horizontal plane,
said first member having means thereon for retaining a vehicle thereon during cleaning, and
said second member having a rotatable cleaning brush thereon adapted to contact the surface of a vehicle on said first member,
said rotatable cleaning brush being mounted for rotation on a generally horizontal axis and disposed above said first member and engageable with upwardly facing surfaces of a vehicle mounted on said first member, during relative rotation between said first and second members.

4. A vehicle cleaning apparatus comprising:
first and second members, one of said members being stationary and the other of said members being rotatable in a generally horizontal plane,
said first member having means thereon for retaining a vehicle thereon during cleaning, and
said second member having cleaner applicator means thereon adapted to contact the surface of a vehicle on said first member,
said cleaner applicator means being disposed above said first member and engageable with upwardly facing surfaces of a vehicle mounted on said first member, during relative rotation between said first and second members,
said applicator means including first and second rotary brushes mounted to said second member and disposed adjacent an axis of relative rotation between said members, said brushes being on opposite sides of said axis.

5. The apparatus of claim 4 wherein:
said first brush is farther from said axis than said second brush.

6. The apparatus of claim 5 wherein:
said second brush is of one diameter near said axis and a larger diameter farther from said axis, to accommodate rubbing contact thereof simultaneously with a vehicle roof and window.

7. The apparatus of claim 4 wherein:
a portion of one of said brushes extends across said axis to provide brushing action therefrom on both sides of said axis.

8. A vehicle cleaning apparatus comprising:
first and second members, one of said members being stationary and the other of said nenbers being rotatable in a generally horizontal plane,
said first member having means thereon for retaining a vehicle thereon during cleaning, and
said second member having cleaner applicator means thereon adapted to contact the surface of a vehicle on said first member,
said second member being a stationary base and super-structure, and said first member being a turntable rotatably mounted thereon,
and drive means,
sprockets mounted on said turntable,
a conveyor belt mounted on said sprockets and having vehicle wheel engaging members spaced therealong,
a drive sprocket connected to and driven by said drive means and engaging and driving said conveyor belt,
and lock means on said turntable and operable to drivingly connect said turntable to said drive means to rotate said turntable, said lock means being releaseable to terminate drive of said turntable while said drive means continue to drive said belt to thereupon move a vehicle off said turntable.

9. A vehicle cleaning apparatus comprising:
first and second members, one of said members being stationary and the other of said members being rotatable in a generally horizontal plane,
siad first member having means thereon for retaining a vehicle thereon during cleaning;
said second member having cleaner applicator means thereon adapted to contact the surface of a vehicle on said first member;
said second member being a stationary base and superstructure, and said first member being a turntable rotatably mounted thereon,
first drive means coupled to said turntable and base to drive said turntable;
second drive means on said turntable to drive accessory means on said turntable; and
coupling means between said base and said turntable to convey driving fluid from a source on said base to said second drive means for energization thereof.

10. The apparatus of claim 9 wherein said coupling means include:
a first manifold secured to said base;
a second manifold secured to said turntable,
said first and second manifolds having mating fluid transfer cavities therein.

11. The apparatus of claim 10 wherein said cavities include:
a plurality of radially spaced circular grooves in one of said manifolds;
a plurality of radially spaced circular ribs received in said grooves and sealed thereto;
means sealing said ribs in said grooves to provide a plurality of radially spaced, circular chambers in said coupling means; and
ports in said grooves and said ribs and in the exterior of said manifolds, with passageways between the exterior and said ports to provide a plurality of independent and separate flow paths between the exterior of said first manifold and the exterior of said second manifold, each different path including a different one of said chambers.

12. The apparatus of claim 11 and further comprising accessory means on said turntable, said accessory means including a conveyor drive motor and a wheel brush drive motor.

13. The apparatus of claim 12 wherein:
two of said chambers and ports and passageways associated therewith are coupled to said conveyor drive motor and provide a fluid energy supply path thereto and return paths therefrom; and
another two of said chambers and ports and passageways associated therewith are coupled to said brush drive motor to provide a fluid energy supply path thereto and return path therefrom.

14. A vehicle cleaning apparatus comprising:
first and second members, one of said members being stationary and the other of said members being rotatable in a generally horizontal plane,
said first member having means thereon for retaining a vehicle thereon during cleaning, and
said second member having cleaner applicator means thereon adapted to contact the surface of a vehicle on said first member,
carriage and rail means connecting said applicator means to said second member, said carriage means being movable linearly along said rail means toward and away from a point near an axis of relative rotation of said members, to move said applicator means linearly to accommodate variations in vehicle contours contacted by said applicator means during relative rotation between said members,
and actuator means coupled to said second member,
said rail means including a rail having a portion coupled to said actuator means, and a portion coupled to said second member, said rail being movable by said actuator means to change the position of said rail to encourage movement of said carriage means, and thereby said applicator means, toward said point.

* * * * *